(12) United States Patent
Badhe et al.

(10) Patent No.: US 8,617,424 B2
(45) Date of Patent: Dec. 31, 2013

(54) TWO STAGE GASIFIER FOR GENERATING SYNGAS

(75) Inventors: Rajesh Muralidhar Badhe, Faridabad (IN); Garapati Siva Ramakrishna, Faridabad (IN); Alok Sharma, Faridabad (IN); Brijesh Kumar, Faridabad (IN); Santanam Rajagopal, Faridabad (IN); Ravinder Kumar Malhotra, Faridabad (IN)

(73) Assignee: Indian Oil Corporation Limited, Faridabad (IN)

( * ) Notice: Subject to any disclaimer, the term of this patent is extended or adjusted under 35 U.S.C. 154(b) by 0 days.

(21) Appl. No.: 13/696,986

(22) PCT Filed: May 6, 2011

(86) PCT No.: PCT/IN2011/000317
§ 371 (c)(1),
(2), (4) Date: Nov. 8, 2012

(87) PCT Pub. No.: WO2011/141927
PCT Pub. Date: Nov. 17, 2011

(65) Prior Publication Data
US 2013/0056685 A1    Mar. 7, 2013

(30) Foreign Application Priority Data

May 10, 2010   (IN) .......................... 1088/DEL/2010

(51) Int. Cl.
*C10J 3/66*   (2006.01)
*C10J 3/18*   (2006.01)
*C10J 3/72*   (2006.01)

(52) U.S. Cl.
USPC .......................................... 252/373; 422/630

(58) Field of Classification Search
None
See application file for complete search history.

(56) References Cited

U.S. PATENT DOCUMENTS

| 4,497,637 A | 2/1985 | Purdy et al. |
|---|---|---|
| 2008/0202028 A1 | 8/2008 | Tsangaris et al. |
| 2009/0084666 A1 | 4/2009 | Agrawal et al. |

FOREIGN PATENT DOCUMENTS

| CA | 2 424 805 A1 | 10/2004 |
|---|---|---|
| EP | 1 475 429 A1 | 11/2004 |
| EP | 1 136 542 A1 | 9/2011 |
| WO | 2008/130260 A1 | 10/2008 |

OTHER PUBLICATIONS

Kim, H.Y., "A low cost production of hydrogen from carbonaceous wastes", International Journal of Hydrogen Energy, Elsevier Science Publishers B.V., vol. 28, No. 11, Nov. 2003, pp. 1179-1186.

*Primary Examiner* — Melvin C Mayes
*Assistant Examiner* — Douglas Call
(74) *Attorney, Agent, or Firm* — Maschoff Brennan

(57) ABSTRACT

The present subject matter describes a gasification system (100) for gasifying a variety of feedstocks. A first stage gasifier (105) receives a feedstock either from a first group of feedstocks or a second group of feedstocks or both. The first stage gasifier decomposes the received feedstock to produce a first product. A second stage gasifier (115) is connected to the first stage gasifier (105) for receiving the first product. In addition, the second stage gasifier (115) receives a feedstock either from a third group of feedstocks or a fourth group of feedstocks or both. The second stage gasifier (115) gasifies the first product and the received feedstock to produce syngas.

17 Claims, 6 Drawing Sheets

Example 1

Example 2

300

Example 5

Example 6

Example 7

TWO STAGE GASIFIER FOR GENERATING SYNGAS

TECHNICAL FIELD

The present subject matter, in general, relates to a gasification process for producing syngas and, in particular, relates to a two stage gasifier for gasifying a variety of feedstocks.

BACKGROUND

Conversion of carbonaceous materials, like biomass, biomass derived liquids, coal, char, coke, petroleum residue etc., into a gaseous fuel with a gasification agent like air, oxygen, and steam is called gasification. Generally, product of the gasification is a mixture mainly consisting of hydrogen and carbon monoxide called synthesis gas or syngas, and varying amounts of nitrogen, carbon dioxide, and hydrogen sulfide etc. During the gasification, ash is removed in the form of dry ash or molten slag during gasification. Also, various types of impurities from the syngas are removed through subsequent treatment steps. Syngas can be used for various purposes like production of chemicals such as methanol and hydrogen, and generation of electricity. Moreover, syngas can also be converted into synthetic fuels by using Fischer-Tropsch process.

Typically, the gasification reactions are endothermic and require combustion reactions to supplement energy requirement. Current approaches of applying gasifying processes such as biomass pyrolysis, moving bed gasification of coal, etc., in conventional gasification systems are targeted towards handling of specific type of feedstock only. Such systems also require extensive and cumbersome up-gradation of products such as pyrolysis oil, tar, and clean up of syngas.

Generally, the conventional gasification systems are operated at a high operating temperature, as a relatively low operating temperature leads to an excessive production of liquid tar along with the syngas. However, operation at such temperature leads to vaporization of metallic impurities and contaminants present within the feedstock. The vaporized impurities and contaminants affect the quality of syngas. Employment of gas cleaning means for removing such vaporized impurities from the finally produced syngas proves complex and adds to the cost.

Due to the high operating temperature, the ash is removed in a solid or molten form at high temperature from the gasifiers, thereby consuming a lot of useful energy and rendering the conventional gasification system energy-inefficient. In addition, removal of such molten slag following gasification at the high temperature is also a tedious task and leads to a substantial heat losses. As a result conventional gasification system requires higher supply of pure oxygen or air.

SUMMARY

The present subject matter describes a gasification system and method to gasify various types of feedstock to produce syngas. The various types of feedstock are separated into different categories based on their ash content, reactivity. The gasification system includes a first stage gasifier to gasify a feedstock selected form either a first group of feedstocks or a second group of feedstocks or both to produce a first product. The first group of feedstocks includes coal with a predefined ash content, while the second group of feedstocks includes biomass, plastic waste etc. Further, a second stage gasifier receives the first product from the first stage gasifier for gasification to produce syngas.

In one embodiment of the invention, in addition to the first product, the second stage gasifier receives a feedstock selected from either a third group of feedstocks or a fourth group of feedstocks or both for gasification. In one implementation, a plasma source is coupled to the second stage gasifier. The plasma source is used to control the temperature of the second stage gasifier for varying the composition of the syngas produced.

The present gasification system is efficient, in terms of energy consumption. The ash and various contaminants are removed at low temperature during the first stage of the gasification. Consequently, the energy efficiency of the gasification system is enhanced as well as the syngas produced is contaminant free. This is because the present gasification system prevents unwanted wastage of energy in removing the ash at a higher temperature or melting the ash to form molten slag. Thus, the cost involved in clean up and treatment of syngas is minimized.

These and other features, aspects, and advantages of the present subject matter will be better understood with reference to the following description and appended claims. This summary is provided to introduce a selection of concepts in a simplified form. This summary is not intended to identify key features or essential features of the claimed subject matter, nor is it intended to be used to limit the scope of the claimed subject matter.

DETAILED DESCRIPTION

Figure 1A:
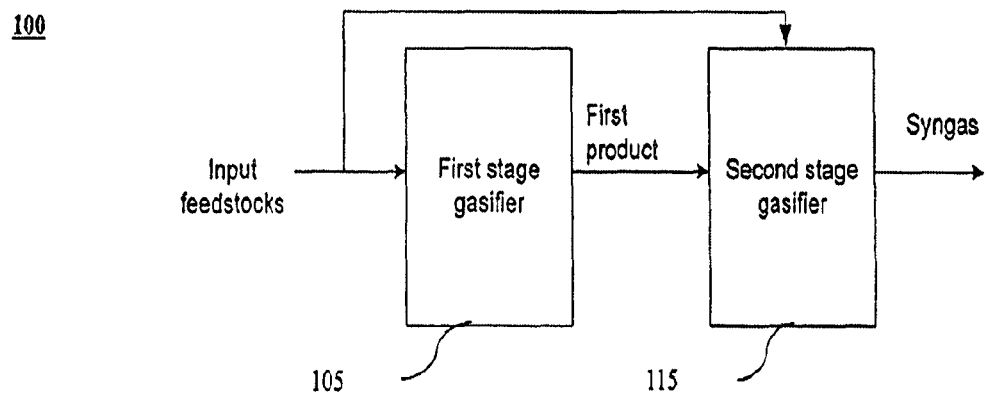
FIG. 1 illustrates a diagrammatic representation of a gasification system, according to one embodiment of the present subject matter.

In one embodiment, the present subject matter describes a two stage gasification system for gasifying feedstocks to generate syngas. In one embodiment, the two stage gasification system includes a first stage gasifier and a second stage gasifier. The first stage gasifier includes a pyrolyzer and a low temperature gasifier while the second stage gasifier includes a high temperature gasifier. The two gasifiers and the pyrolyzer within the gasification system operate under different temperatures and reaction conditions and are configured to receive different types of feedstock for gasification or decomposition.

The present gasification system facilitates gasification of a wide variety of feedstocks in a single unit to generate syngas. The feedstocks are segregated depending upon various parameters such as ash content and reactivity. Depending on these parameters, different types of the feedstock are fed to both of the gasifiers or the pyrolyzer or all of them for gasification. As aforementioned, the two gasifiers and the pyrolyzer operate under different conditions and accordingly they are individually better suited for different type of feedstocks.

In one embodiment, the first stage gasifier receives at least one feedstock from a first group of feedstocks or a second group of feedstocks. In one implementation, coal having a pre-defined ash content is fed as a part of the first group of feedstocks, while biomass and plastic waste is fed as a part of the second groups of feedstocks. The feedstock received in the first stage gasifier is gasified at a low operating temperature, to produce a first product. Ash and other contaminants are removed from the first product at the low operating temperature.

Since the first stage gasifier operates at a substantially low temperature, vaporization of ash and other contaminants is prevented. Accordingly, such impurities are easily removable in an unvaporized form from the first stage gasifier at the low temperature. Removal of impurities at low temperature helps in preserving energy and results in higher energy efficiency of the gasification system.

The first product, which is substantially free from ash and other contaminants, is fed to the second stage gasifier. The high temperature gasifier in the second stage gasifier operates at a high temperature to gasify the first feedstock for producing syngas. In one implementation, the high temperature gasifier additionally receives a feedstock from a third group of feedstocks or a fourth group of feedstocks for gasification to produce the syngas. The third group of feedstocks may include low to medium reactive feedstock such as pet-coke, solvent deasphalted pitch, bitumen, char and other heavy oils. The fourth group of feedstocks may include various biomass derived feedstock such as pyrolysis oil, black liquor as well as plastic waste and shale oil etc.

As ash and other impurities are removed prior to the final high temperature gasification, the finally obtained syngas requires a minimum level of scrubbing or treatment and may be directly used as a fuel. In addition, the syngas produced may be used for the purposes of generating fuels, electricity, hydrogen gas or synthesis of various chemicals.

In addition, the second stage gasifier is configured to utilize oxygen present within either the first product or the fourth group of feedstocks or both, for the purpose of gasification. As a result, substantially less amount of oxygen from an external oxygen source is required in the gasification system. Thus, the present gasification system provides an energy efficient and clean system for gasification of the wide variety of feedstock.

FIG. 1 illustrates a gasification system 100, according to one embodiment of the present subject matter. As shown in FIG. 1a, the gasification system 100 includes a first stage gasifier 105 and a second stage gasifier 115. Accordingly, the gasification system 100 may also be referred to as an integrated two-stage gasifier or simply, a two stage gasifier. Input feedstocks are provided to the gasification system 100, such that both of the gasifiers are configured to receive different types of feedstocks out of the input feedstocks. Also, the products from the first stage gasifier 105 are fed to the second stage gasifier 115 for further gasification, as explained later. The gasification may be interchangeably referred to as decomposition in the forthcoming description.

Figure 1B:
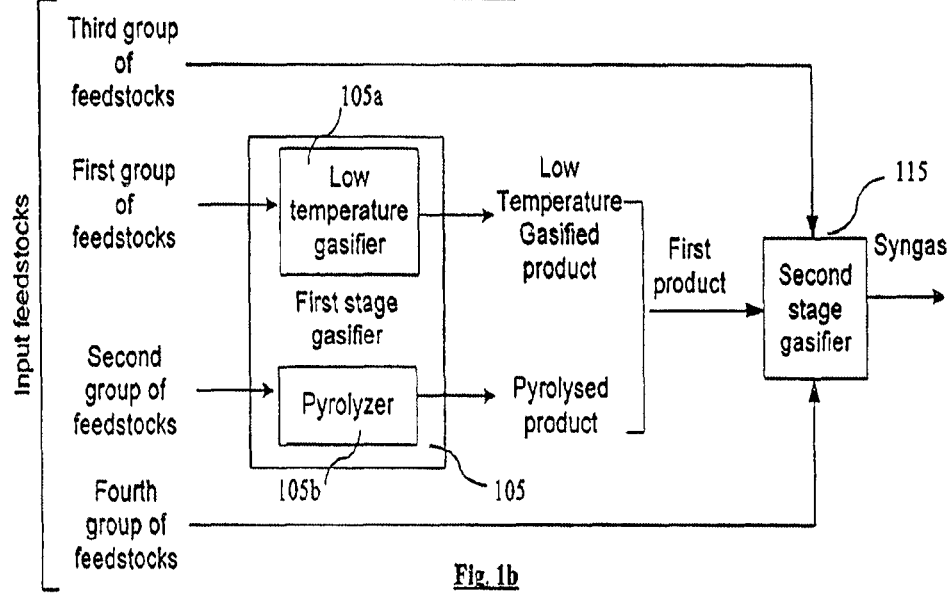

Further, as depicted in FIG. 1b, the first stage gasifier 105 includes either a low temperature gasifier 105a or a pyrolyzer 105b or both. The first stage gasifier 105 receives at least one feedstock from a first group of feedstocks or a second group of feedstocks. If the feedstock fed to the first stage gasifier 105 is selected from the first group of feedstocks, it is fed to the low temperature gasifier 105a. On the other hand, if the feedstock is selected from the second group of feedstocks it is fed to the pyrolyzer 105b. In one embodiment, the low temperature gasifier 105a and the pyrolyzer 105b may each receive a feedstock from the first group of feedstocks and the second group of feedstocks, respectively.

The first group of feedstocks includes coal having a pre-defined ash content. For example, the pre-defined ash content may be about 0 to 50 percent by weight. In one implementation, the second group of feedstocks include biomass and plastic waste. As known in the existing art, the biomass is generally rich in oxygen. In one embodiment, the first stage gasifier 105 operates at a temperature in a range of about 500° C. to 700° C. In addition, the low temperature gasifier 105a may act as a moving bed or a fluidized bed gasifier.

Further, the second stage gasifier 115 receives a feedstock from either a third group of feedstocks or a fourth group of feedstocks or both, out of the input feedstocks for gasification. The third group of feedstock includes a low to medium reactive feedstock, which may further include petcoke, char, solvent deasphalted pitch, bitumen and other heavy oils. In addition, the fourth group of feedstocks includes biomass derived feedstock such as pyrolysis oil, black liquor as well as shale oil etc. In one embodiment, the fourth group of feedstocks may also include plastic waste.

The second stage gasifier 115 is a high temperature gasifier 115 operating at a relatively higher temperature range of about 1400° C. to 1500° C. The heat energy required for the gasification or decomposition reactions within the second stage gasifier 115 is generated by oxidation of a portion of the feedstock present in the second stage gasifier 115 as well as from a plasma source (shown in FIG. 2).

Figure 2:
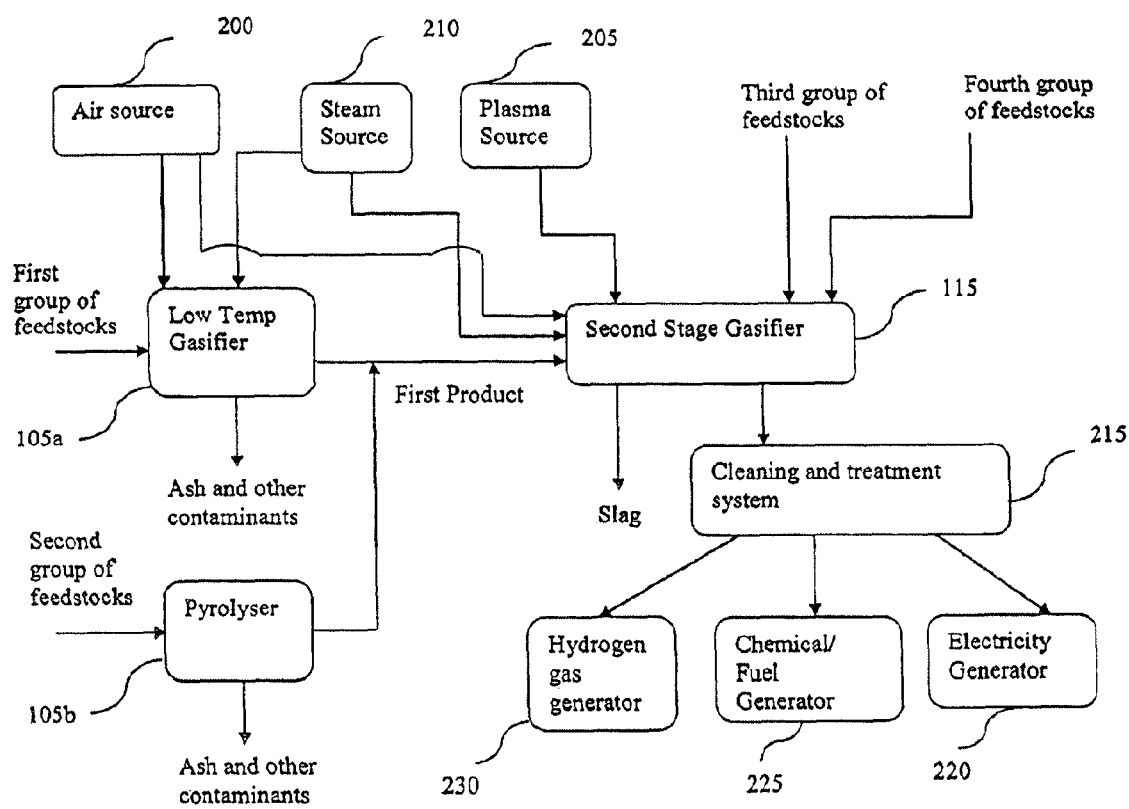
FIG. 2 illustrates the gasification system of FIG. 1, according to one embodiment of the present subject matter.

FIG. 2 illustrates a detailed representation of the gasification system of FIG. 1, according to one embodiment of the present subject matter.

In operation, the low temperature gasifier 105a receives supply of air or oxygen from an air source 200 and steam from a steam source 210. The low temperature gasifier 105a decomposes or gasifies the first group of feedstocks in the presence of air or oxygen at the temperatures in the range of about 500° C. to 700° C., to produce the first product. The first product, in the gaseous form, may include syngas, tar. The syngas is mainly composed of carbon monoxide, hydrogen. The operating temperature within the low temperature gasifier 105a prevents vaporization of ash and other contaminants present within the supplied feedstock.

The above mentioned operating temperature of the low temperature gasifier 105a maintains the ash and other contaminants to remain in the un-vaporized form within the low temperature gasifier 105a. Such un-vaporized form facilitates an easily removal of the ash and other contaminants from the bottom of the low temperature gasifier 105a. In this manner, heat losses associated with removal of ash at higher operating temperatures are prevented. A substantial quantity of tar may be produced as a part of the first product because of the low operating temperature. However, the present gasification system 100 facilitates optimum cracking of tar to produce syngas in the second stage gasifier 115.

The pyrolyser 105b receives the second group feedstock, which undergoes decomposition in the absence of oxygen to produce the first product. Such decomposition may be referred to as pyrolysis and takes place in a temperature range of about 500° C. to 550° C. The second group of feedstocks includes either biomass or plastic waste or both. The first product produced by the pyrolyzer 105b includes syngas, char, pyrolysis oil. The decomposition of biomass as a part of the second group of feedstocks leads to a substantial concentration of oxygen within the first product.

Like the low temperature gasifier 105a, the operating temperature of the pyrolyser 105b helps in retaining the un-vaporized form of the ash and other contaminants within the pyrolyzer, thereby facilitating the easy removal process from the bottom of the pyrolyser 110. Accordingly, the first product is substantially free from ash and other contaminants.

The first product, which may be produced by either the low temperature gasifier 105a or the pyrolyzer 105b or both, is directed to the second stage gasifier 115 for further gasification.

As mentioned before, the second stage gasifier 115 or the high temperature gasifier 115 can also receive a feedstock from either the third group of feedstocks or the fourth group of feedstocks or both, in addition to the first product. The total feedstock received by the second stage gasifier 115 requires a high temperature for gasification and cracking of a substantially high amount of tar present therein as well as for gasification of the low reactive feedstock. In order to supplement the heat energy for the purpose of achieving the high temperature, the second stage gasifier 115 receives heat energy from a plasma source 205. The plasma source 205 provides the heat energy by a method, as known in the art. Accordingly, temperatures of 1400° C. to 1500° C. degrees or more can be achieved within the second stage gasifier 115.

In addition, steam is also supplied from the steam source 210 to the second stage gasifier 115 for supporting the gasification. Accordingly, in one embodiment of the present subject matter, the second stage gasifier 115 decomposes or gasifies the first product as well as one or more feedstocks received from amongst the third and the fourth group of feedstocks. Such decomposition or gasification is facilitated by the provision of steam, oxygen and the heat energy. The provision of heat energy by the plasma source 205 supports the decomposition at the high temperature. Further, the heat energy supplied by the plasma source 205 also affects the composition of the syngas and accordingly the plasma source 205 may be controlled to obtain a syngas of a desired composition.

Further, the second stage gasifier 115 is configured to utilize oxygen, which is inherently present within the total feedstock received by the second stage gasifier 115, for the purposes of decomposition of the total feedstock. Such inherent presence of oxygen is facilitated by the presence of the biomass derived feedstock as a part of the fourth group of feedstocks, within the total feedstock. In other embodiment of the present subject matter, the second stage gasifier 115 may only receive the first product from the first stage gasifier 105 for gasification, without receiving the third and fourth groups of feedstocks. In such circumstance, the second stage gasifier 115 will gasify the first product in the operable conditions for the second stage gasifier 115, as previously discussed.

The complete gasification of the total feedstock inside the high temperature gasifier 115 generates syngas of more consistent quality, as compared to the syngas obtained within the conventional gasifiers. A substantially small amount of slag may also be produced, which can be removed from the high temperature gasifier 115 using methods known in the art.

The syngas thus produced has an increased concentration of carbon monoxide and hydrogen, as compared to the syngas produced by the conventional gasification systems. Such composition of syngas may be varied by controlling an amount of the supplied plasma energy from the plasma source 205. In addition, the composition of syngas is also dependent upon the type of feedstock and the quantity of steam, supplied to the gasification system 100. The variation in the syngas composition may be performed to meet requirements of syngas of varying composition.

Moreover, the syngas produced inside the second stage gasifier 115 is substantially free of impurities due to removal of ash in the un-vaporized form prior to the second stage gasifier 115. In addition, the syngas has substantially lower levels of carbon dioxide, as substantially less oxygen or air is used during decomposition in the second stage gasifier 115. Accordingly, the syngas may require a relatively simpler cleaning and treatment system 215, as compared to a conventional gasification system. In accordance with an another embodiment of the present subject matter, the syngas obtained from the second stage gasifier 115 may be directly obtained without employing the cleaning and treatment system 215, owing to presence of substantially less concentration of impurities.

In terms of application of syngas as a raw material, the syngas may be fed to an electricity generator 220 for the purpose of generating electricity. The electricity thus produced can be partly used as an energy input to the plasma source 205. Apart from this, the syngas may also be fed to a chemical or fuel generator 225 as the raw material for generating various hydrocarbon-based chemicals like methanol etc. or transportation fuels like gasoline, diesel, etc. Similarly, the syngas may be fed to the hydrogen gas generator 230 for generating hydrogen gas as known in the existing art.

Without limiting the scope of the present subject matter, the syngas obtained by the present gasification system 100 may be sold and directly utilized as a fuel for heat engines and may be used in other applications as known in the existing art.

Figure 3:
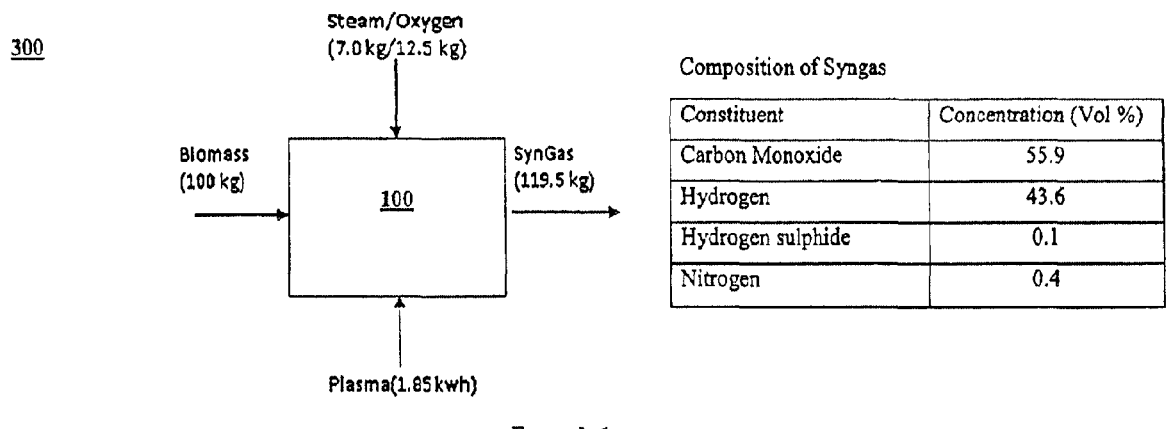
FIGS. 3-6 illustrate the process of producing syngas by means of different examples.
Figure 3:
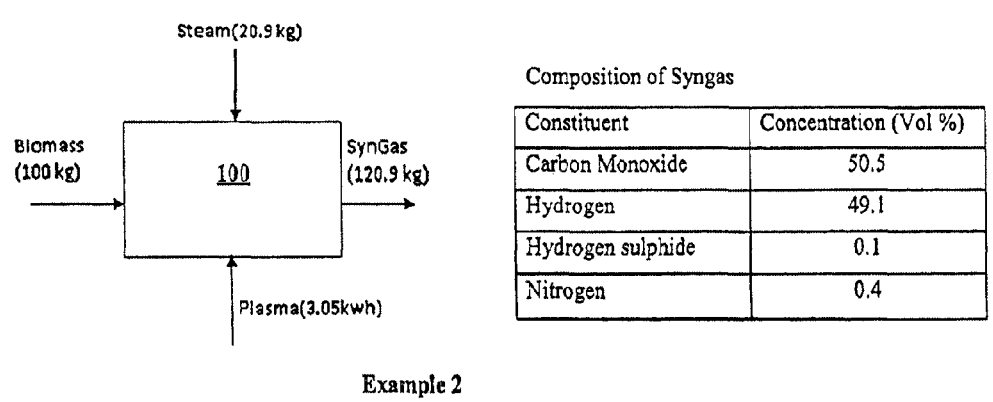
Figure 4:
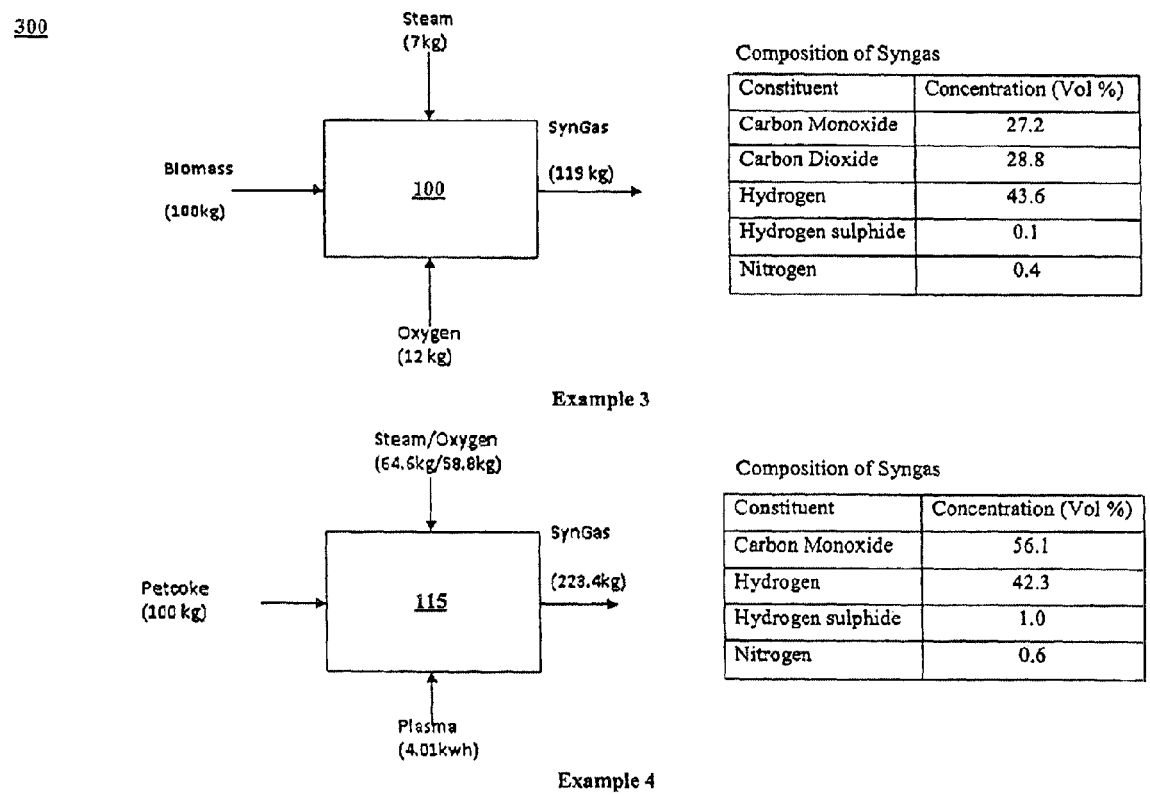
Figure 5:
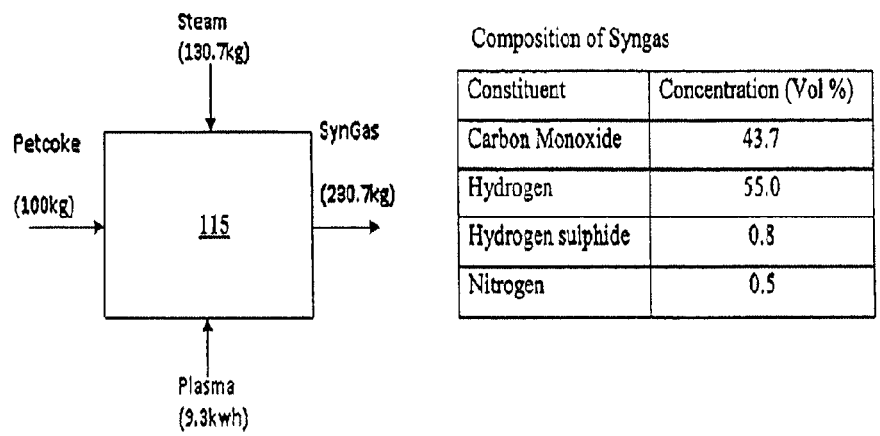
Figure 5:
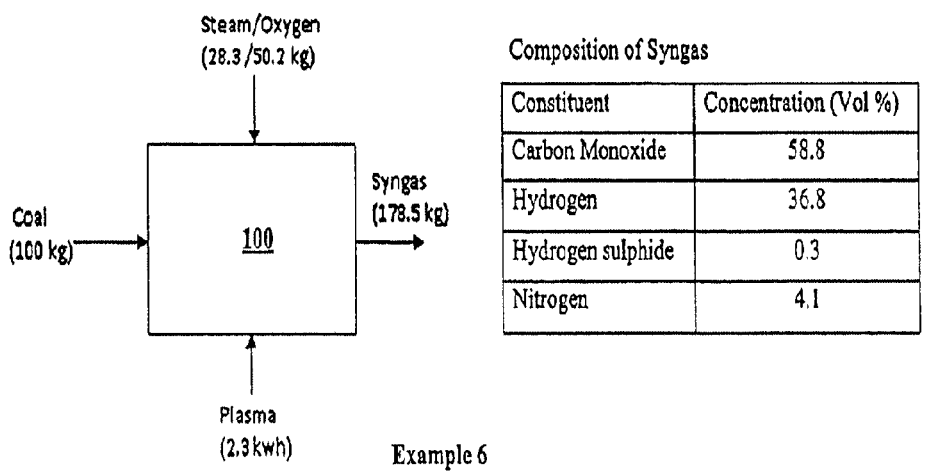
Figure 6:
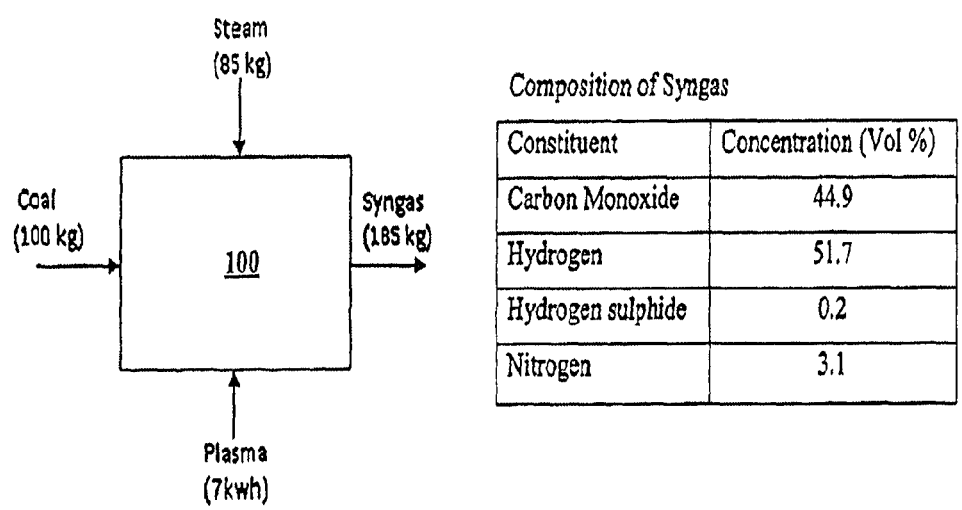

FIG. 3 depicts a diagrammatical illustration 300 of producing syngas by means of different examples. These examples relate to experiments conducted for producing the syngas, such that each experiment elaborates upon production of syngas of a particular quantity and composition, by varying the input parameters. However, it will be appreciated that the process is not limited to these experiments only, and different reaction conditions leading to different compositions in the syngas can be conceived. The forthcoming description elaborates upon the outcome of the present experiments.

Example 1 as depicted in the FIG. 3 illustrates a material balance and syngas composition in terms of gasification of biomass by utilizing steam, oxygen and the plasma energy within the present gasification system 100. Whereas, Example 2 denotes the material balance and syngas composition by utilizing only steam and the plasma energy for gasification. As evident from the first two examples (Examples 1 and 2) and the corresponding tables, the supply of oxygen is inversely related to the supply of plasma energy to the gasification system 100. Both the plasma energy and the oxygen act as oxidizing agents during the gasification.

Further, Example 3 illustrates the material balance and syngas composition in terms of gasification of biomass, by utilizing steam and oxygen within the gasification system 100. The presence of oxygen (O2) alone in Example 3 as the oxidizing agent leads to a substantial concentration of carbon dioxide (CO2) within the syngas (as shown in table of Example 3). As evident from these first three examples, the supply of biomass to the gasification system 100 generates syngas having a weight about 19% to 20% more than the weight of the supplied biomass.

Further, Example 4 illustrates the material balance and syngas composition in terms of the high temperature gasification of pet coke, by utilizing steam, oxygen, and plasma energy within the second stage gasifier 115. Whereas, Example 5 illustrates the material balance and syngas composition in terms of the high temperature gasification of pet coke, by utilizing steam and plasma energy within the second stage gasifier 115.

As aforementioned in the description of FIG. 1, the petcoke based feedstock is categorized as having medium to low reactivity. Accordingly, the petcoke is fed to the high temperature gasifier 115, as shown in the Example 4 and the Example 5. As evident from these examples and their corresponding tables, a comparatively higher concentration of the steam and oxygen and a higher amount of plasma energy is required in case of gasification of the petcoke as compared to the biomass. It may be understood from the Example 4 and the Example 5, that the supply of petcoke to the second stage gasifier 115 generates syngas having a weight about 120% to 130% more than the weight of the supplied petcoke.

Further, Example 6 illustrates the material balance and syngas composition in terms of the two stage gasification of coal, by utilizing steam, oxygen, and plasma energy within the present gasification system 100. Whereas, Example 7 illustrates the material balance and syngas composition in terms of the two stage temperature gasification of coal, by utilizing steam and plasma energy within the present gasification system 100.

As evident from these examples (Examples 6 and 7) and their corresponding tables, a comparatively higher concentration of the steam and oxygen and a higher amount of plasma energy is required in case of gasification of coal as compared to the biomass. However, the total concentration of steam and water and the amount of plasma energy required for gasification of coal is lesser as compared to pet-coke. It may be understood from the Example 6 and the Example 7, that the supply of coal to the gasification system 100 generates syngas having a weight about 78% to 90% more than the weight of the supplied coal.

The previously described versions of the subject matter and its equivalent thereof have many advantages, including those which are described herein.

The gasification system 100 facilitates gasification of a wide variety of feedstock in a single unit. As explained before, the present system 100 is able to decompose highly reactive feedstock like biomass and its derivatives, moderate to low reactive feedstock and high ash containing coal by employing different types of gasifiers within a single gasification system.

It is quite well known that different regions across the world differ in terms of the availability of the feedstock material. Accordingly, the present gasification system 100 may be globally employed.

The present system 100 employs optimized operating temperatures in the two stages of gasification to prevent ash and contaminant vaporization, thereby facilitating an easy removal of the ash and other contaminants in the un-vaporized form prior to the second stage gasifier 115. Accordingly, a relatively clean feed is fed to the second stage gasifier 115, thereby generating syngas that is significantly free from the ash and other contaminants as compared to the conventionally generated syngas. Accordingly, clean-up costs required for the syngas are substantially reduced.

Moreover, the easy removal of ash at low temperature from the first stage gasifier 105 prevents heat losses generally associated with removal of ash at the high temperature. In addition, melting of ash within the second stage gasifier 115 is substantially reduced. Accordingly, the wastage of energy associated with the melting of ash is considerably reduced.

Further, the gasification system 100 requires substantially less oxygen from the external means, as compared to the conventional gasification systems. This is facilitated by utilization of oxygen already present in the oxygen rich feedstock supplied to the gasification system 100. Accordingly, the air source 200 employed to act as oxygen source provides substantially less oxygen, thereby being less costly. In addition, the low supply of oxygen for gasification within the gasification system 100 minimizes concentration of carbon dioxide in the finally produced syngas.

Furthermore, the gasification system 100 implements variation in supply of the plasma energy to vary the composition of syngas. Accordingly, syngas having different compositions may be produced, on the basis of various requirements.

Although the subject matter has been described with reference to specific embodiments, this description is not meant to be construed in a limiting sense. Various modifications of the disclosed embodiments, as well as alternate embodiments of the subject matter, will become apparent to persons skilled in the art upon reference to the description of the subject matter. It is therefore contemplated that such modifications can be made without departing from the spirit or scope of the present subject matter as defined.

The invention claimed is:

1. A method for producing syngas comprising:
   a first stage gasification process for gasifying a first feedstock at a temperature in the range of 500° C. to 700° C. to produce a first gaseous product comprising tar, syngas and a solid waste comprising ash;
   prolyzing a second feed stock to produce a second gaseous product comprising pyrolyzer oil;
   combining the first gaseous product with the second gaseous product to obtain a first product;
   a second stage gasification process for gasifying the first product to produce syngas; and
   controlling operating temperature during the second stage gasification process for regulating composition of the syngas.

2. The method as claimed in claim 1, wherein the method further comprises removing a solid waste comprising ash from the first stage gasification process at the temperature range of about 500° C. to 700° C. to reduce concentration of contaminants within the first product.

3. The method of claim 1, wherein the pyrolyzing of a second group of feed stock is performed in a pyrolyzer to produce the gaseous product comprising pyrolyzer oil.

4. The method of claims 1, wherein the second stage gasification is performed in a second stage gasifier configured to receive the first product and to gasify the first product to produce syngas.

5. The method of claim 1, wherein the first stage gasification is performed in
   a first stage gasifier configured to gasify a first group of feedstocks having a predefined ash content.

6. The method as claimed in claim 1, wherein the second stage gasifier is a high temperature gasifier configured to receive at least one feedstock from a group consisting of a third group of feedstocks and a fourth group of feedstocks and to gasify the feedstock along with the first product to produce syngas.

7. The method as claimed in claim 1, wherein the method further comprises introducing at least one feedstock selected from a group consisting of a third group of feedstocks and a fourth group of feedstocks in the second stage gasification process.

8. The method as claimed in claim 7, wherein the feedstock from the third group of feedstocks is selected from the group consisting of Pet-coke, Char, heavy oil, Bitumen, and solvent deasphalted pitch.

9. The method as claimed in claim 7, wherein the feedstock from the fourth group of feedstocks is a biomass derived feedstock consisting of Black liquor and Pyrolysis oil along with Shale oil.

10. The method as claimed in claim 7, wherein the method further comprises segregating input feedstocks into a first group of feedstocks, a second group of feedstocks, the third group of feedstocks and the fourth group of feedstocks based on reactivity and ash content.

11. The method as claimed in claim 1, wherein the method further comprises segregating input feedstocks into a first group of feedstocks and a second group of feedstocks based on reactivity and ash content.

12. The method as claimed in claim 11, wherein the first stage gasification process operates at a low temperature range of about 500° C. to 700° C.

13. The method as claimed in claim 11, wherein the second stage gasification process operates at a high temperature range of about of 1400° C. to 1500° C.

14. The method as claimed in claim 11, wherein at least one feedstock from the first group of feedstocks is selected from the group consisting of coal having 0-50% of ash by weight.

15. The method as claimed in claim 11, wherein the at least one feedstock from the second group of feedstocks is selected from the group consisting of biomass and plastic waste.

16. The method as claimed in claim 1, wherein controlling the operating temperature during the second stage gasification process comprises controllably supplying plasma energy to maintain a temperature range of about 1400° C. to 1500° C.

17. The method as claimed in claim 16, wherein controllably supplying plasma energy comprises controlling operation of the plasma source separately linked to the second stage gasifier.

* * * * *

UNITED STATES PATENT AND TRADEMARK OFFICE
Certificate

Patent No. 8,617,424 B2                                                                Patented: December 31, 2013

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Rajesh Muralidhar Badhe, Faridabad (IN); Garapati Siva Ramakrishna, Faridabad (IN); Alok Sharma, Faridabad (IN); Brijesh Kumar, Faridabad (IN); Santanam Rajagopal, Faridabad (IN); Ravinder Kumar Malhotra, Faridabad (IN); and Anand Kumar, Faridabad (IN).

Signed and Sealed this Twenty-fifth Day of November 2014.

MELVIN C. MAYES
*Supervisory Patent Examiner*
Art Unit 1732
Technology Center 1700